Sept. 15, 1925.
W. H. ELLIOTT
RELIEF VALVE FOR STORAGE TANKS
Filed Feb. 18, 1922
1,553,807
Fig.1,
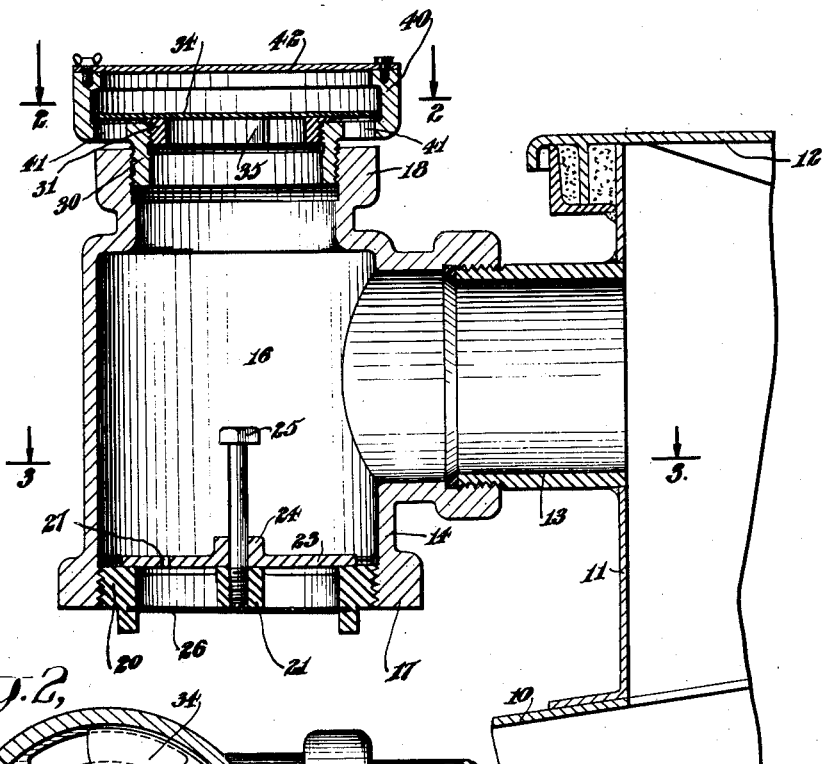
Fig.2,
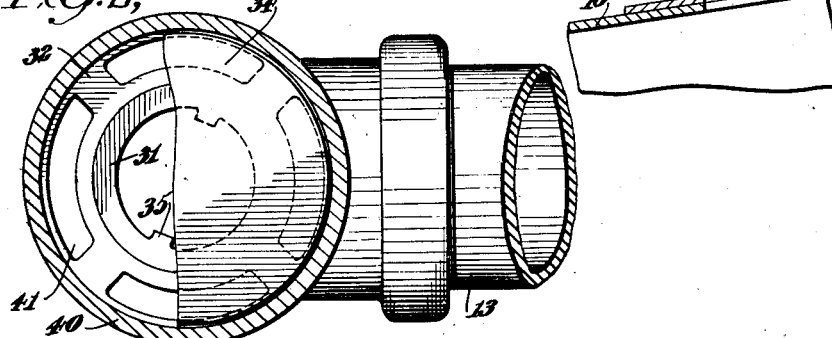
Fig.3.
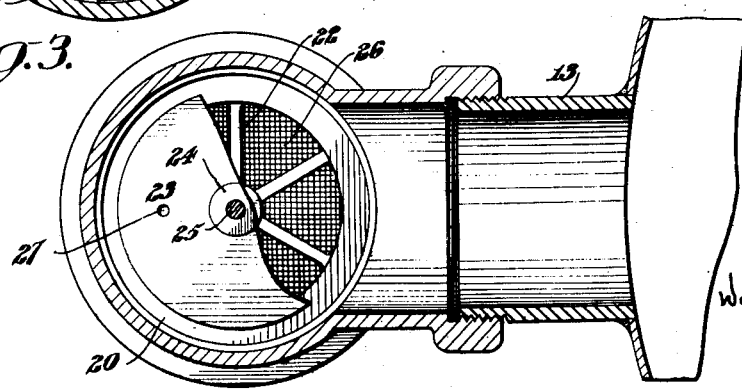
INVENTOR
Walton H. Elliott
ATTORNEY Patented Sept. 15, 1925

1,553,807

UNITED STATES PATENT OFFICE.

WALTON H. ELLIOTT, OF PORT ARTHUR, TEXAS, ASSIGNOR TO THE TEXAS COMPANY, OF NEW YORK, N. Y., A CORPORATION OF TEXAS.

RELIEF VALVE FOR STORAGE TANKS.

Application filed February 18, 1922. Serial No. 537,561.

*To all whom it may concern:*

Be it known that I, WALTON H. ELLIOTT, a citizen of the United States of America, and a resident of Port Arthur, county of Jefferson, and State of Texas, have invented certain new and useful Improvements in a Relief Valve for Storage Tanks, of which the following is a specification, reference being had to the accompanying drawing, forming a part thereof.

This invention relates to storage tanks for inflammable or explosive liquids, and more particularly to relief valves for relieving such tanks of excessive exterior or interior pressure.

Storage tanks for inflammable liquids such as kerosene, gasoline, and the like are in constant danger of fire and the consequent explosion of volatile gases is apt to destroy the tank unless the pressure is instantaneously released.

One form of explosion hatch for permitting the escape of combustion gases produced by explosion or otherwise, through the hatchway, is shown in patent to Hull, No. 1,396,719, issued November 8th, 1921. Variations in temperature of the contents of such a tank however, cause an appreciable amount of expansion and contraction, and unless such variations in volume are relieved, excessive strains may be set up in the structure of the tank. Such temperature variations may be merely the ordinary variations caused by climatic or diurnal changes. Furthermore, in emptying such tanks the escape of liquids tends to set up a vacuum or partial vacuum in the space above the liquid in the tank and atmospheric pressure exerted on the exterior of the tank may introduce excessive strains upon the structure of which the tank is formed.

The present invention provides means for relieving such pressures, both the internal pressure caused by temperature expansion, and the external pressure caused by the partial vacuum, resulting from contraction or emptying. This action is sometimes known as "breathing" of the tank.

According to one feature of the invention simple pipe fittings of commercial type are provided in combination with quickly detachable means for opening a passageway when a predetermined pressure is exceeded.

Other objects will appear from the following description of the invention taken in connection with the drawing in which—

Fig. 1 shows a section of one form of my relief valve applied to the hatchway of a tank, Fig. 2 shows a horizontal section of the line 2—2 of Fig. 1, a part of the valve being broken away to show the valve seat, and Fig. 3 shows a horizontal section of the line 3—3 of Fig. 1, a part of the valve being broken away to show the valve seat.

Like reference characters denote like parts in the several figures of the drawing.

Referring to the drawing there is shown a preferred embodiment of my invention applied to a tank 10 having a usual hatchway or dome 11, equipped with a hatch 12. The hatch and hatchway may be of any desired form, that shown being of the type described in the patent to Hull above referred to, only so much of the hatch being shown as is necessary to an understanding of the present invention. Extending radially from the hatchway 11 is a horizontal tubular passage 13 which may be secured to the hatchway 11 in any suitable manner, as for example by being welded thereto. The extension 13 preferably comprises a conventional form of metal pipe having its outer end screw-threaded in a usual manner. Attached to the extension 13 by means of the screw-threaded connection is a chambered member in the form of a three-way coupling or T 14. The coupling 14 has a vertically disposed chamber 16 terminating in a pair of internally threaded annular flanges 17, 18 forming outlet passages for the chamber 16.

For the lower passage through the flange 17 there is provided a plug 20 having its peripheral surface threaded to fit the threads of the flange 17 and having a centrally disposed hub extension 21 supported by a plurality of webs 22, 22. The webs 22 are relatively light in construction so that a relatively free and clear passage way is available through the plug 20. The upper face of the plug 20 is machined to form a seat for a plate 23, of aluminum or other suitable light metal, the plate 23 having a central hub portion 24 with a smooth surfaced orifice through the center thereof. Extending through this orifice is a bolt 25 screw-threaded into the hub 21 of the plug 20.

The arrangement is such that the plate 23 is slidably mounted upon the shaft of the screw 25 but is held normally in place on the upper surface of the plug 20 by force of gravity, thus sealing the opening. The weight of the plate 23 is such that only when a vacuum of predetermined degree exists within the tank will the force of atmospheric pressure upon its under surface be sufficient to raise it, and its diameter is less than the inner diameter of the chamber 16, so that when raised a relief passage exists around its periphery. A gauze screen 26 may be provided to prevent entry of dirt and other foreign material.

A valve housing adapted to contain a pressure relief valve is threadedly secured within the upper end of the annular flange 18. The housing comprises an externally threaded tubular member 30 which is screwed into the threaded opening within the flange 18. A plurality of outwardly extending webs 32 are formed integral with the upper end of the tubular member 30 and on their outer ends they support an upwardly extending annular collar or flange 40 which in the present instance is formed integral with the webs 32. The spaces or interstices between the several webs 32 constitute air passages or outlet passages 41—41.

The upper end of the tubular member 30 is internally threaded to receive an externally threaded annular ring 31 which is made of aluminum or other suitable material and provided with a plurality of inwardly projecting ears or dogs 35. The upper face of the annular ring 31 is machined to form a seat for a circular plate 34 which is made of aluminum or other suitable material of relatively light weight. A cover plate 42 is provided across the upper end of the annular collar 40 to protect the mechanism from dirt and other foreign matter. The weight of the plate 34 is such that it is lifted from its seat as soon as a predetermined pressure relative to atmospheric pressure exists within the tank 10, and its diameter is less than the inner diameter of the collar 40 so that free vertical movement of the valve within the housing is possible at all times.

The various parts of the device may be readily assembled, the plate 23 being mounted upon the plug 20 and the machine screw 25 being applied, these three elements being thereafter placed within the opening of the flange 17.

Similarly, the valve housing comprising the tubular member with its outwardly projecting webs and upwardly extending annular flange is screwed into position within the flange 18 so that the webs 32 are disposed somewhat above the upper flange 18. The annular ring 31 is then screwed within the upper end of the tubular member and the disk valve 34 is set in position within the housing. Finally, the cover plate 42 is screwed into position for protecting the interior of the device from the weather and from foreign matter.

The operation of the device will be readily understood from the foregoing description and from the examination of the drawing, it being obvious that excessive pressure within the tank will unseat the disc valve 34 forcing the same upwardly so that the vapors or gases escaping from the tank 10 may pass from the valve housing to the atmosphere through the air passages 41—41.

Similarly a partial vacuum set up within the tank will be effectually destroyed by the unseating of the member 23 which will slide upon the body of the bolt 25 and air will enter the tank through the spaces between the webs 22, 22.

After such displacement of the member 34 or the member 23, either of these members will resume its normal position.

Apparatus of preferred form and construction has been illustrated and described for the purpose of showing a way in which this invention may be practiced, but the inventive thought upon which this application is based is broader than this illustrative embodiment. It is therefore understood that the scope of the invention is not to be limited by the present disclosure, reference being had to the appended claims for that purpose.

What is claimed is:

1. A relief valve for storage tanks comprising a chambered member having a plurality of ports, one of said ports being in open communication with the tank, a valve housing removably secured in one of the ports in said chambered member and comprising a tubular member threadedly secured to said chambered member and having at its upper end a plurality of radially extending webs terminating in an upwardly extending annular flange connecting the outer ends of all of said webs, an annular ring threadedly secured in the upper end of said tubular member and constituting a valve seat, a disc-like valve of greater diameter than that of the annular ring normally seated upon said seat and adapted to be raised from said seat when the pressure within the tank becomes excessive, and means for closing the open top of said housing.

2. A relief valve for storage tanks comprising a multi-passage chambered member having a horizontally disposed passage connected to and in open communication with the tank and two vertically disposed passages, means in the lower passage for admitting air to the tank when the vacuum therein becomes excessive, a valve housing comprising a tubular member threadedly secured within the upper passage and having a plurality of outwardly extending spaced webs and an upwardly extending annular collar on the outer ends of said webs, an annular valve seat secured in the upper end of the tubular member, and a pressure responsive disc-like valve seated on said valve seat without the chambered member and within the housing and adapted to be unseated when the pressure within the tank becomes excessive, whereby the escaping vapors or gases are discharged to the atmosphere through the interstices between the webs in said housing.

3. A relief valve for storage tanks comprising a T shaped coupling member having a plurality of ports therein, one of said ports being in open communication with the tank, a valve in another of said ports for automatically controlling the admission of air to the tank when the degree of vacuum therein becomes excessive, and means for relieving excessive pressure within the tank comprising a tubular member adapted to be secured to the other port and having a plurality of outwardly projecting webs connected at their outer ends by an upwardly extending annular flange, an annular ring threadedly secured within the upper end of the tubular member and constituting a valve seat, a disc-like valve normally seated by gravity on said seat and adapted to be raised therefrom to permit the escape of gases or vapors through the interstices between the webs when the pressure in the tank is sufficiently excessive to raise said disc valve, and a cover plate removably secured to the open upper end of said housing.

In witness whereof I have hereunto set my hand this 3rd day of February, 1922.

W. H. ELLIOTT.